US011624317B2

(12) United States Patent
Holley et al.

(10) Patent No.: US 11,624,317 B2
(45) Date of Patent: Apr. 11, 2023

(54) SUPERCRITICAL FLUID SYSTEMS

(71) Applicant: Raytheon Technologies Corporation, Farmington, CT (US)

(72) Inventors: Brian M. Holley, Eastford, CT (US); Christopher Britton Greene, Hebron, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 0 days.

(21) Appl. No.: 17/559,281

(22) Filed: Dec. 22, 2021

(65) Prior Publication Data

US 2022/0275752 A1 Sep. 1, 2022

Related U.S. Application Data

(63) Continuation of application No. 17/018,471, filed on Sep. 11, 2020, now Pat. No. 11,225,905.

(51) Int. Cl.
*F02C 1/10* (2006.01)
*F01K 25/10* (2006.01)
(Continued)

(52) U.S. Cl.
CPC ............... *F02C 1/10* (2013.01); *F01K 7/32* (2013.01); *F01K 21/04* (2013.01); *F01K 25/103* (2013.01); *F02C 7/185* (2013.01); *F02C 6/18* (2013.01); *F02C 7/18* (2013.01); *F05D 2210/12* (2013.01); *F05D 2220/323* (2013.01); *F05D 2220/76* (2013.01)

(58) Field of Classification Search
CPC .......... F02C 1/10; F01K 25/103; F01K 21/04; F01K 7/32
See application file for complete search history.

(56) References Cited

U.S. PATENT DOCUMENTS 3,745,389 A 7/1973 Lorch
6,304,011 B1 10/2001 Pullen et al.
(Continued)

FOREIGN PATENT DOCUMENTS

| CN | 108625917 A | 10/2018 |
| JP | 2000358344 A | 12/2000 |
| WO | 2020014084 A1 | 1/2020 |

OTHER PUBLICATIONS

Great Britain Office Action for GB Application No. 2112945.7, dated Feb. 16, 2022, 4 pages.

*Primary Examiner* — Katheryn A Malatek
(74) *Attorney, Agent, or Firm* — Cantor Colburn LLP

(57) ABSTRACT

Supercritical fluid systems and aircraft power systems are described. The systems include a compressor, a turbine, and a generator. A primary working fluid flow path has a primary working fluid that passes through the compressor, a separator, the turbine, and back to the compressor. A secondary working fluid flow path having a secondary working fluid that passes through the generator, the compressor, the separator, and back to the generator. The primary working fluid and the secondary working fluid are compressed and mixed within the compressor to form a mixture of the two fluids and the separator separates the mixture of the two fluids to direct the primary working fluid back to the turbine and the secondary working fluid to the generator.

20 Claims, 4 Drawing Sheets

(51) Int. Cl.
*F01K 7/32* (2006.01)
*F01K 21/04* (2006.01)
*F02C 7/18* (2006.01)
*F02C 6/18* (2006.01)

(56) References Cited

U.S. PATENT DOCUMENTS

| | | |
|---|---|---|
| 9,885,283 B2 | 2/2018 | Vaisman et al. |
| 10,587,170 B2 | 3/2020 | Ribarov et al. |
| 2002/0047340 A1 | 4/2002 | Lewis |
| 2014/0060002 A1* | 3/2014 | Sonwane ............ F02C 3/04 60/39.182 |
| 2016/0061055 A1* | 3/2016 | Bowan ............ F01D 15/10 290/40 B |
| 2016/0369746 A1* | 12/2016 | Armstrong ............ F02C 3/10 |
| 2017/0363002 A1* | 12/2017 | Hwang ............ F01K 3/20 |
| 2020/0219631 A1* | 7/2020 | Filippone ............ G21C 13/02 |

\* cited by examiner

SUPERCRITICAL FLUID SYSTEMS

CROSS-REFERENCE TO RELATED APPLICATIONS

This application is a continuation of U.S. patent application Ser. No. 17/018,471, filed Sep. 11, 2020, the disclosure of which is incorporated herein by reference in its entirety.

TECHNICAL FIELD

The present disclosure relates generally to supercritical fluid systems, including closed loop systems, and more specifically to buffering of supercritical fluid systems.

BACKGROUND

Supercritical carbon dioxide ($sCO_2$) turbo generator efficiency is particularly affected by windage and heat generation of a generator rotor.

Windage is managed by pumping out a generator cavity well below the lowest cycle pressure. The pumping power itself is a parasitic loss to the system, and pumping and windage need to be balanced as efficiency loss mechanisms. Seals are used to help reduce the pumping requirements, but windage and pumping loss remain primary detriments to system efficiency. Perfect seals, however, would not be desirable, due to consideration related to heat removal.

Heat generated within the generator rotor needs to be removed for the generator efficiency to remain high. Leakage past seals into a generator cavity is typically used to cool the generator before being pumped back to the $sCO_2$ cycle pressures.

It is desirable to have a method for windage and pumping power reduction, while maintaining a generator rotor temperature sufficiently low for efficient power conversion.

BRIEF SUMMARY

According to some embodiments, supercritical fluid systems are provided. The supercritical fluid systems include a compressor, a turbine operably coupled to the compressor, a generator operably coupled to the turbine and configured to generate power, a primary working fluid flow path having a primary working fluid configured to pass through the compressor, a separator, the turbine, and back to the compressor, and a secondary working fluid flow path having a secondary working fluid configured to pass through the generator, the compressor, the separator, and back to the generator. The primary working fluid and the secondary working fluid are compressed and mixed within the compressor to form a mixture of the two fluids and the separator is configured to separate the primary working fluid from the secondary working fluid from the mixture of the two fluids and direct the primary working fluid back to the turbine along the primary working fluid flow path and the secondary working fluid along the secondary working fluid flow path to the generator.

In addition to one or more of the features described above, or as an alternative, further embodiments of the supercritical fluid systems may include that the secondary working fluid is hydrogen.

In addition to one or more of the features described above, or as an alternative, further embodiments of the supercritical fluid systems may include that the secondary working fluid is helium.

In addition to one or more of the features described above, or as an alternative, further embodiments of the supercritical fluid systems may include that the compressor and the turbine are part of a waste heat recovery system of a gas turbine engine.

In addition to one or more of the features described above, or as an alternative, further embodiments of the supercritical fluid systems may include that the mixture of the two fluids within the compressor has a uniform pressure and a uniform temperature at an outlet of the compressor.

In addition to one or more of the features described above, or as an alternative, further embodiments of the supercritical fluid systems may include that the mixture is generated within the compressor.

In addition to one or more of the features described above, or as an alternative, further embodiments of the supercritical fluid systems may include that the separator is a cyclone separator or a gravity separator.

In addition to one or more of the features described above, or as an alternative, further embodiments of the supercritical fluid systems may include that the separator is a membrane separator.

In addition to one or more of the features described above, or as an alternative, further embodiments of the supercritical fluid systems may include a recuperating heat exchanger arranged along the primary working fluid flow path.

In addition to one or more of the features described above, or as an alternative, further embodiments of the supercritical fluid systems may include that the generator includes a rotor, wherein the secondary working fluid flow path passes along the rotor to provide cooling thereto.

In addition to one or more of the features described above, or as an alternative, further embodiments of the supercritical fluid systems may include that the secondary working fluid is configured to prevent entrainment of the primary working fluid around the rotor.

In addition to one or more of the features described above, or as an alternative, further embodiments of the supercritical fluid systems may include that the compressor is a shrouded blade compressor and the secondary working fluid is directed to provide cooling to shrouded blades of the shrouded blade compressor.

In addition to one or more of the features described above, or as an alternative, further embodiments of the supercritical fluid systems may include that the turbine is a shrouded blade turbine and the secondary working fluid is directed to provide cooling to shrouded blades of the shrouded blade turbine.

In addition to one or more of the features described above, or as an alternative, further embodiments of the supercritical fluid systems may include a cooling heat exchanger arranged along the secondary working fluid flow path between the separator and the generator.

In addition to one or more of the features described above, or as an alternative, further embodiments of the supercritical fluid systems may include that the compressor, the generator, and the turbine are part of an industrial generator.

According to some embodiments, aircraft power systems are provided. The aircraft power systems include at least one engine and a supercritical fluid system. The supercritical fluid system includes a compressor, a turbine operably coupled to the compressor, a generator operably coupled to the turbine and configured to generate power, a primary working fluid flow path having a primary working fluid configured to pass through the compressor, a separator, the turbine, and back to the compressor, and a secondary working fluid flow path having a secondary working fluid configured to pass through the generator, the compressor, the separator, and back to the generator. The primary working fluid and the secondary working fluid are compressed and mixed within the compressor to form a mixture of the two fluids and the separator is configured to separate the primary working fluid from the secondary working fluid from the mixture of the two fluids and direct the primary working fluid back to the turbine along the primary working fluid flow path and the secondary working fluid along the secondary working fluid flow path to the generator.

In addition to one or more of the features described above, or as an alternative, further embodiments of the aircraft power systems may include that the supercritical fluid system is configured as a waste heat recovery system for the at least one engine.

In addition to one or more of the features described above, or as an alternative, further embodiments of the aircraft power systems may include that the secondary working fluid is hydrogen.

In addition to one or more of the features described above, or as an alternative, further embodiments of the aircraft power systems may include that the secondary working fluid is helium.

In addition to one or more of the features described above, or as an alternative, further embodiments of the aircraft power systems may include that the supercritical fluid system is configured to generate power for the aircraft.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
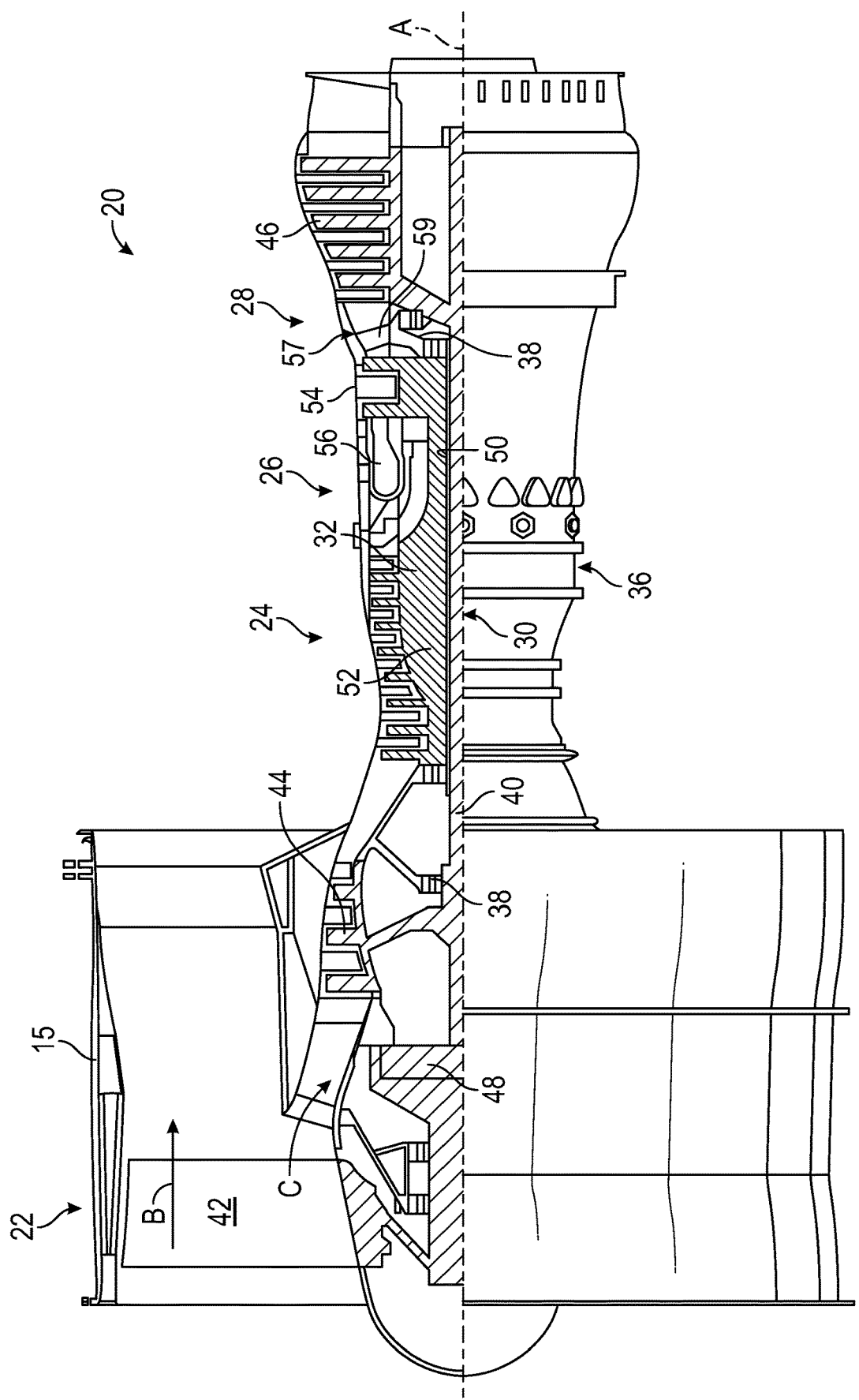
FIG. 1 is a schematic cross-sectional illustration of a gas turbine engine architecture that may employ various embodiments disclosed herein.

FIG. 1 schematically illustrates a gas turbine engine 20 that may incorporate embodiments described herein. As illustratively shown, the gas turbine engine 20 is configured as a two-spool turbofan that has a fan section 22, a compressor section 24, a combustor section 26, and a turbine section 28. The illustrative gas turbine engine 20 is merely for example and discussion purposes, and those of skill in the art will appreciate that alternative configurations of gas turbine engines may employ embodiments of the present disclosure. The fan section 22 includes a fan 42 that is configured to drive air along a bypass flow path B in a bypass duct defined within a nacelle 15. The fan 42 is also configured to drive air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines.

In this two-spool configuration, the gas turbine engine 20 includes a low speed spool 30 and a high speed spool 32 mounted for rotation about an engine central longitudinal axis A relative to an engine static structure 36 via one or more bearing systems 38. It should be understood that various bearing systems 38 at various locations may be provided, and the location of bearing systems 38 may be varied as appropriate to a particular application and/or engine configuration.

The low speed spool 30 includes an inner shaft 40 that interconnects the fan 42 of the fan section 22, a first (or low) pressure compressor 44, and a first (or low) pressure turbine 46. The inner shaft 40 is connected to the fan 42 through a speed change mechanism, which, in this illustrative gas turbine engine 20, is as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the combustor section 26 between the high pressure compressor 52 and the high pressure turbine 54. A mid-turbine frame 57 of the engine static structure 36 is arranged between the high pressure turbine 54 and the low pressure turbine 46. The mid-turbine frame 57 may be configured to support one or more of the bearing systems 38 in the turbine section 28. The inner shaft 40 and the outer shaft 50 are concentric and rotate via the bearing systems 38 about the engine central longitudinal axis A which is collinear with their longitudinal axes.

The core airflow through core airflow path C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 (e.g., vanes) which are arranged in the core airflow path C. The turbines 46, 54 rotationally drive the respective low speed spool 30 and high speed spool 32 in response to the expansion of the core airflow. It will be appreciated that each of the positions of the fan section 22, the compressor section 24, the combustor section 26, the turbine section 28, and geared architecture 48 or other fan drive gear system may be varied. For example, in some embodiments, the geared architecture 48 may be located aft of the combustor section 26 or even aft of the turbine section 28, and the fan section 22 may be positioned forward or aft of the location of the geared architecture 48.

The gas turbine engine 20 in one example is a high-bypass geared aircraft engine. In some such examples, the engine 20 has a bypass ratio that is greater than about six (6), with an example embodiment being greater than about ten (10). In some embodiments, the geared architecture 48 is an epicyclic gear train, such as a planetary gear system or other gear system, with a gear reduction ratio of greater than about 2.3 and the low pressure turbine 46 has a pressure ratio that is greater than about five (5). In one non-limiting embodiment, the bypass ratio of the gas turbine engine 20 is greater than about ten (10:1), a diameter of the fan 42 is significantly larger than that of the low pressure compressor 44, and the low pressure turbine 46 has a pressure ratio that is greater than about five (5:1). The low pressure turbine 46 pressure ratio is pressure measured prior to inlet of low pressure turbine 46 as related to the pressure at the outlet of the low pressure turbine 46 prior to an exhaust nozzle. In some embodiments, the geared architecture 48 may be an epicycle gear train, such as a planetary gear system or other gear system, with a gear reduction ratio of greater than about 2.3:1. It should be understood, however, that the above parameters are only for example and explanatory of one non-limiting embodiment of a geared architecture engine and that the present disclosure is applicable to other gas turbine engines including turbojets or direct drive turbofans or turboshafts.

A significant amount of thrust is provided by the bypass flow B due to the high bypass ratio. The fan section 22 of the gas turbine engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Gas turbine engines generate substantial amounts of heat that is exhausted from the turbine section 28 into a surrounding atmosphere. This expelled exhaust heat represents wasted energy, and can be a large source of inefficiency in gas turbine engines.

Figure 2:
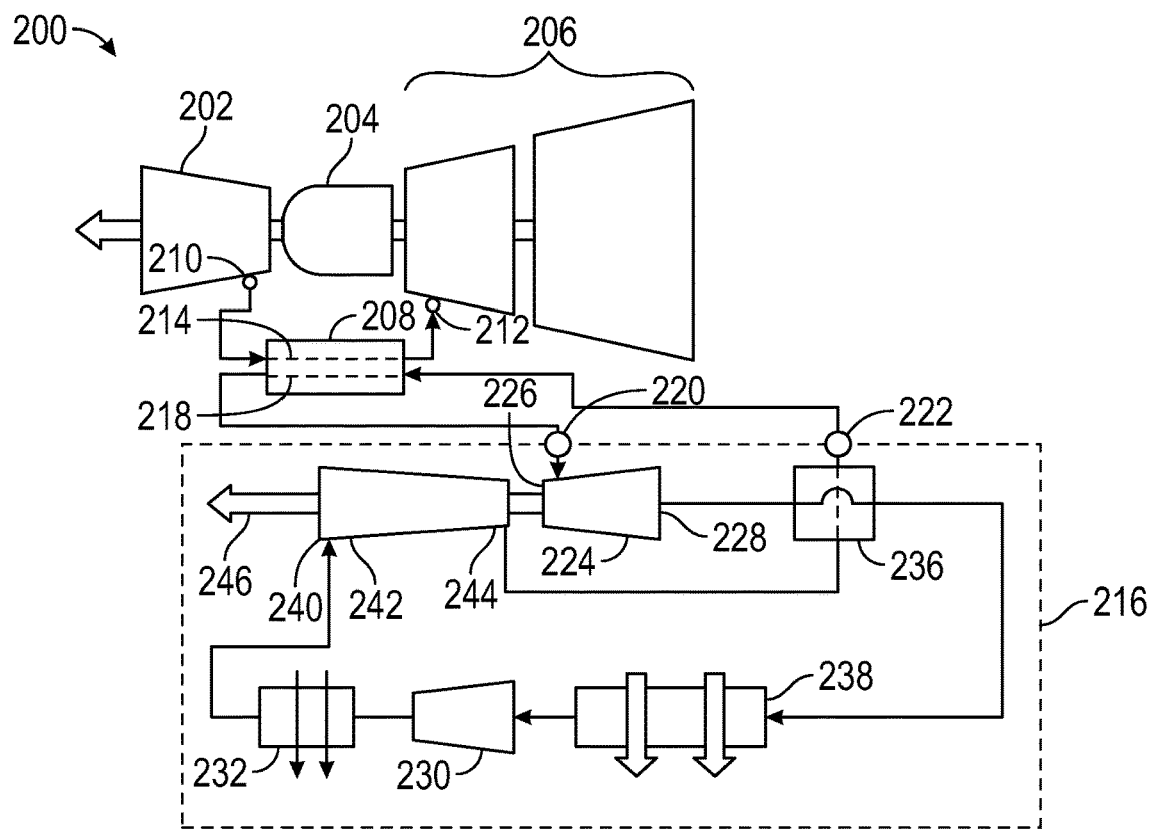
FIG. 2 is a schematic illustration of a gas turbine engine including a cooled cooling air driven overexpanding, recuperating supercritical $CO_2$ cycle that may incorporate embodiments of the present disclosure.

Turning now to FIG. 2, a schematic illustration of a gas turbine engine 200, including a compressor section 202, a combustor section 204, and a turbine section 206, all of which are connected via a primary fluid flow path, is shown. The gas turbine engine 200 may have, for example, a similar structure and configuration as that shown and described with respect to FIG. 1. The turbine cooling air is employed to provide cooling to the turbines and other components of the gas turbine engine 200.

To recapture the waste heat within the gas turbine engine 200 and convert such waste heat to work, a waste heat recovery heat exchanger 208 is connected to a compressor bleed port 210 and a turbine inlet 212. The waste heat recovery heat exchanger 208 provides a hot flow path 214 that connects the compressor bleed port 210 to the turbine inlet 212. As such, the hot flow path 214 bypasses the combustor section 204. In one non-limiting example, the compressor bleed port 210 is located at or downstream of an aft most compressor stage of the compressor section 202. Further, in some embodiments, the turbine inlet 212 is arranged at or upstream of the upstream-most turbine stage of the turbine section 206.

As the air from the compressor bleed port 210 is passed through the waste heat recovery heat exchanger 208, a portion of the heat in the bypassed air may be extracted at the waste heat recovery heat exchanger 208. The heat extracted from the hot flow path 214 provides the air at the turbine inlet 212 to be at an appropriate pressure and temperature to be used to cool portions of the turbine section 206. The waste heat recovery heat exchanger 208 extracts heat from the air bled from the compressor section 202 and provides the extracted heat to a waste heat recovery system 216. The waste heat recovery system 216 is configured to use the waste heat to generate work and provide the generated work to one or more engine systems within the gas turbine engine 200. The waste heat recovery heat exchanger 208 includes the hot flow path 214 (may be a first fluid path) that connects the compressor bleed port 210 to the turbine inlet 212, and a cold flow path 218 (may be a second fluid path) that connects an inlet 220 of the waste heat recovery system 216 and an outlet 222 of the waste heat recovery system 216.

Within the waste heat recovery heat exchanger 208, heat is transferred from air within the hot flow path 214 to working fluid within the cold flow path 218. The cold flow path 218 is connected to the waste heat recovery system 216. In some embodiments, the waste heat recovery system 216 is configured as a supercritical $CO_2$ ($sCO_2$) Brayton cycle. The waste heat recovery system 216 converts the extracted heat into work (e.g., rotational work and/or electrical) which is provided to at least one additional engine system of the gas turbine engine 200. The waste heat recovery system 216 includes a working fluid (e.g., $sCO_2$) that is retained and used within a closed-loop system (e.g., within the waste heat recovery system 216). The waste heat recovery system 216 recuperates waste heat and expands the $sCO_2$ working fluid below the supercritical pressure during a working cycle. Such expansion of the $sCO_2$ is referred to as an overexpanded recuperating work recovery cycle.

In the illustrative configuration, included within the waste heat recovery system 216 is a turbine 224 with an inlet 226 connected to an output of the waste heat recovery heat exchanger 208. The turbine 224 is configured to expand the heated working fluid and expels the heated working fluid through a turbine outlet 228. The turbine 224 may be configured to expand the working fluid beyond an expansion that would place the working fluid back at, or just above, the supercritical point prior to a beginning of a working fluid cycle. This expansion may be referred to as overexpansion. As a result of the overexpansion, a secondary compressor 230 and a second heat rejection heat exchanger 232 are, optionally, included within the working cycle of the waste heat recovery system 216 to return the working fluid ($sCO_2$) to a pressure and temperature required to achieve a supercritical state at the beginning of a working cycle.

From the turbine 224, the expelled working fluid is passed through a relatively hot passage of a recuperating heat exchanger 236. The working fluid is then passed to a relatively hot passage of a first heat rejection heat exchanger 238. After passing through the first heat rejection heat exchanger 238, the working fluid is passed to the secondary compressor 230 and the second heat rejection heat exchanger 232. The working fluid is then passed to an inlet 240 of a compressor 242 (alternately referred to as a working fluid compressor 242). The compressor 242 is configured to compress the working fluid and direct the compressed working fluid from a compressor outlet 244 to a cold passage of the recuperating heat exchanger 236. In practical terms, the location of the inlet 240 of the working fluid compressor 242 is referred to as the start of the working fluid cycle.

During operation of the waste heat recovery system 216, the compressor 242 compresses the working fluid, and passes the compressed working fluid through the recuperating heat exchanger 236 and the waste heat recovery heat exchanger 208, causing the compressed working fluid to be heated. The heated working fluid is provided to the inlet 226 of the turbine 224 and expanded through the turbine 224, driving the turbine 224 to rotate. As described above, the turbine 224 is configured to overexpand the working fluid beyond a point that would return the working fluid to the state of the working fluid at the beginning of the cycle. The rotation of the turbine 224 drives rotation of the compressor 242, the overexpansion compressor 230, and an output shaft 246. In some embodiments, the output shaft 246 maybe mechanically connected or coupled to one or more additional turbine engine systems. In such embodiments, the coupling of the output shaft 246 provides work to the connected systems using any conventional means for transmitting rotational work. In some embodiments and configurations, the rotational work can be converted into electricity and used to power one or more engine or aircraft systems. By way of example, transmitting rotational work can include a drive shaft, a gear system, an electrical generator and distribution system, or any similar structure(s). In the illustrated example, the working fluid is a $CO_2$ fluid that is maintained at or above a supercritical point throughout the entirety of the working cycle. Due to being maintained at or above the supercritical point, the waste heat recovery system 216 may be referred to as a supercritical $CO_2$ cycle ($sCO_2$ cycle).

Although described above with the $sCO_2$ cycle as forming a waste heat recovery system, in some configurations, the $sCO_2$ cycle may be used as a power generation system (e.g., employing output shaft 246). Further, in some embodiments, the $sCO_2$ cycle may be separate from a gas turbine engine and may be a standalone power generation system.

Figure 3:
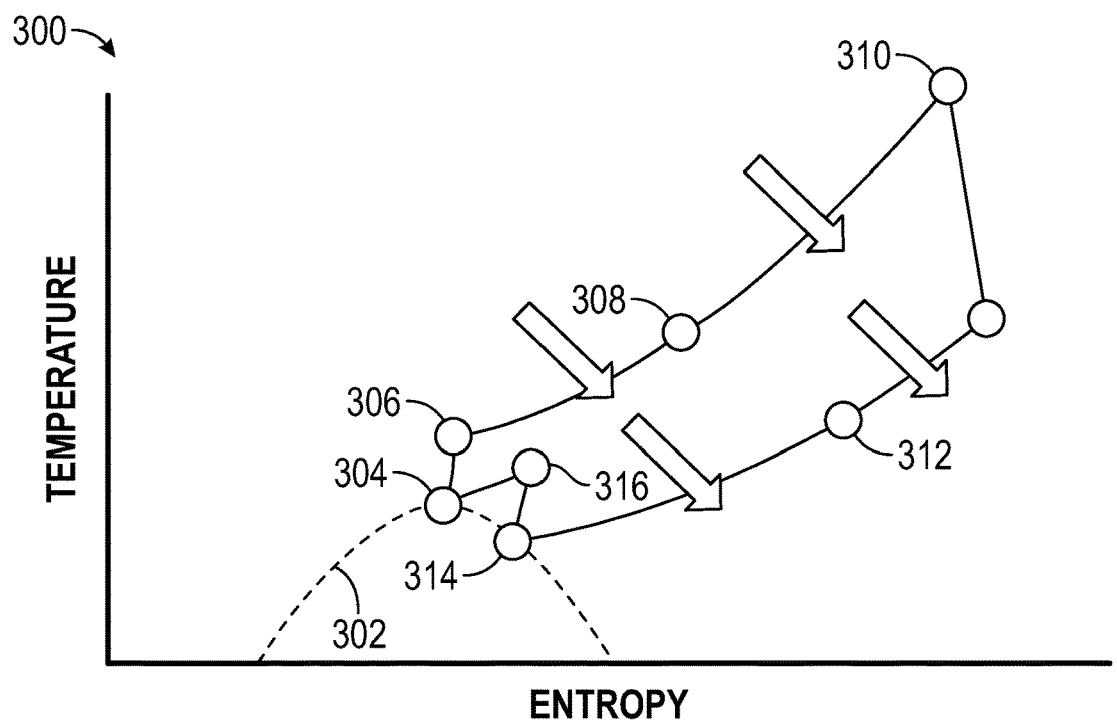
FIG. 3 illustrates a recuperating supercritical $CO_2$ cycle diagram.

Referring now to FIG. 3, a chart 300 illustratively shows a state of a working fluid throughout a working cycle of a waste heat recovery system in accordance with an embodiment of the present disclosure. For example, chart 300 may represent a state plot of a working fluid within the waste heat recovery system 216 shown in FIG. 2. The chart 300 illustrates the relationship of temperature with respect to entropy of the working fluid. Initially, the working fluid starts at or above a peak of a vapor dome 302 at a starting point 304. The vapor dome 302 represents an upper boundary above which the working fluid is at the corresponding supercritical point. Reference will be made, for explanatory purposes, with respect to the waste heat recovery system 216 shown in FIG. 2. For example, the starting point 304 is the state of the working fluid at, for example, the inlet of the compressor 242, prior to the working fluid undergoing compression by the compressor 242.

As noted, the working fluid is compressed in the compressor 242, causing the temperature and pressure of the working fluid to increase, while also imparting a minimal increase in the entropy of the working fluid until the working fluid is expelled from the compressor 242. Point 306 of the chart 300 represents the state of the working fluid at the compressor outlet 244. After exiting the compressor 242, the working fluid is passed through the recuperating heat exchanger 236, where the temperature and entropy of the working fluid are increased to point 308, at an outlet of the recuperating heat exchanger 236.

The working fluid is then passed from the outlet of the recuperating heat exchanger 236 to the waste heat recovery heat exchanger 208. Within the waste heat recovery heat exchanger 208, the entropy and temperature of the working fluid are increased to a point 310 on chart 300. The point 310 represents the state of the working fluid at the outlet of the waste heat recovery heat exchanger 208 and at the inlet 226 of the turbine 228. Further, the point 310 represents the peak temperature and entropy of the working fluid in the cycle.

As power is extracted from the working fluid in the turbine 224, the temperature and pressure of the working fluid will drop. The pressure is reduced below the level of the start of the cycle (point 304) and needs to be compressed back up to the pressure at the starting point 304. The overexpansion in the turbine 224 allows for additional work extraction compared to expanding to the pressure of the start of the cycle (point 304). After work has been extracted by the turbine 224, the overexpanded working fluid is provided to the recuperating heat exchanger 236 and a portion of the excess heat is transferred from the expanded working fluid to working fluid between points 306 and 308 of the chart 300 (representative of the cycle). The state of the working fluid at the outlet of the recuperating heat exchanger 236 and the inlet of the first heat rejection heat exchanger 238 is illustrated at point 312.

To improve operations of the waste heat recovery system 216, the waste heat recovery system 216 employs the second heat rejection heat exchanger 232 to return the state of the working fluid to as close to the starting point 304 as possible. Due to the overexpansion at the turbine 224, the pressure of the working fluid at an outlet of the heat rejection heat exchanger 238 (point 314) is lower than required to maintain the working fluid at a supercritical point at the start of the working fluid cycle. To address this, the working fluid is pressurized in the secondary compressor 230. The pressurization results in a pressure and temperature of the working fluid at an outlet (point 316) of the secondary compressor 230 being above that which is required to maintain the supercritical state of the working fluid. The second heat rejection heat exchanger 232 is used to transfer waste heat in a similar manner as the first heat rejection heat exchanger 238, and returns the working fluid to the inlet 240 of the working fluid compressor 242. The waste heat can be transferred into any number of heat sinks within the gas turbine engine including, but not limited to, fan duct air, ram air, fuel, and a transcritical $CO_2$ refrigeration cycle. The multiple stages of compression, with heat rejection in between, creates an intercooled compression that increases the bottoming cycle efficiency.

In the illustrated example presented in chart 300 of FIG. 3, the starting point 304 of the cycle is immediately at the vapor dome 302. In practical examples, the starting point can be targeted at slightly above the vapor dome in order to prevent minor variations during operation and other practical considerations from causing the working fluid to fall below the vapor dome 302.

In certain situations and/or configurations heat exchanger pressure losses and size may be concerns, especially with respect to the first and/or second heat rejection heat exchangers 232, 238 shown in FIG. 2. In some configurations of the waste heat recovery systems described above (e.g., a supercritical $CO_2$ bottoming cycle concept), if the waste heat is transferred into a fan duct or ram air via a heat rejection heat exchanger to return the working fluid to its starting point temperature, then there is a limited pressure drop available for the cold side of the heat exchanger (e.g., second heat rejection heat exchanger 232 shown in FIG. 2).

A higher pressure drop would allow for a more compact, lighter weight second heat exchanger. Also, in a low fan pressure ratio stream, air will not naturally enter the second heat exchanger without extensive baffling, which can incur additional pressure losses and weight.

It will be appreciated that the configuration of the above described embodiments is merely for example and explanatory purposes, and other configurations are possible without departing from the scope of the present disclosure. For example, in some configurations, the secondary compressor and/or the second heat rejection heat exchanger, described with respect to FIG. 2, may be optional components in the system (e.g., may be removed or not necessary in certain configurations). The cooler exchanger, in some embodiments, may be arranged within a bypass flow stream that is not part of the hot section of a gas turbine engine. For example, in some embodiments, the cooler exchanger may be arranged within or along the bypass flow path B in a bypass duct, as shown in FIG. 1. In other embodiments, the cooler heat exchanger may be arranged within an inlet scoop, such as on a turboshaft engine configuration. Furthermore, although described herein as supercritical systems, the term supercritical system can include transcritical cycles, where portions of the cycle are below the supercritical state, and thus the term "supercritical system" refers generally to the systems shown and described herein and is not to be limiting that all portions of cycles of some systems embodied herein are completely supercritical at all times and locations along the cycle.

Figure 4:
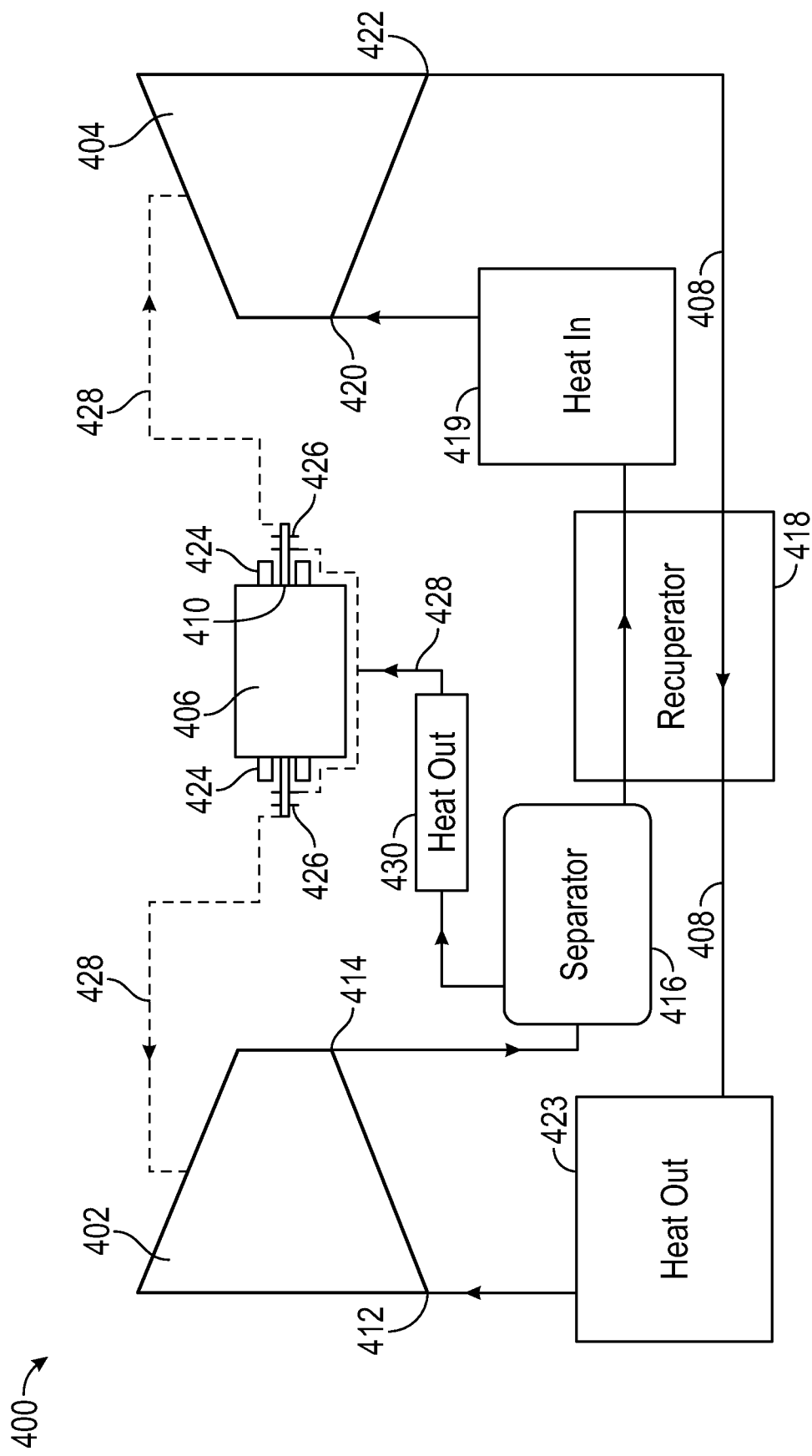
FIG. 4 is a schematic of a closed loop supercritical system in accordance with an embodiment of the present disclosure.

Referring now to FIG. 4, a schematic illustration of a closed loop supercritical system 400 illustratively shown. The closed loop supercritical system 400 may be part of an aircraft system (e.g., as part of a waste heat recovery system, such as shown and described above) or may be a standalone power system. In some embodiments, the closed loop supercritical system 400 may be a power generation system, such as an industrial generator or an onboard power generator for aircraft.

The closed loop supercritical system 400 includes a compressor 402 and a turbine 404 each operably coupled to a generator 406. A working fluid is passed through a primary working fluid flow path 408 through both the compressor 402 and the turbine 404 in order to drive a drive shaft 410 of the generator 406. The working fluid may be supercritical $CO_2$ that is maintained within a hermetically sealed containment within the primary working fluid flow path 408. Because the $sCO_2$ is maintained within a hermetic containment, the working fluid may be used to drive the turbine 404 to drive rotation of the drive shaft 410 and the compressor 402 in a closed-loop manner.

Traveling along the primary working fluid flow path 408, the $sCO_2$ will enter the compressor 402 at a compressor inlet 412 and be compressed therein, thus increasing a temperature and pressure of the working fluid. The compressed $CO_2$ will exit the compressor 402 through a compressor outlet 414 and pass through a separator 416, described below, to separate the $CO_2$ from other gases that may be mixed with the $CO_2$ during the closed loop cycle. The $CO_2$ will then enter a recuperating heat exchanger 418, where additional heat pickup may be achieved, and then passed into a turbine inlet 420 of the turbine 404. An optional additional heat pickup heat exchanger 419 may be arranged between the recuperating heat exchanger 418 and the turbine inlet 420. Within the turbine 404, the $CO_2$ will undergo expansion, and work will be extracted therefrom. The $CO_2$ will then exit the turbine 404 through a turbine outlet 422, flow through the recuperating heat exchanger 418 and back to the compressor inlet 412. An optional additional cooling heat exchanger 423 may be arranged between the recuperating heat exchanger 418 and the compressor inlet 412. In some embodiments, each of the compressor 402 and/or the turbine 404 may include multiple stages and potentially multiple rotors and associated systems, and embodiments of the present disclosure are not limited to single stage/rotor compressors or turbines.

As power is extracted from the working fluid in the turbine 404, the temperature and pressure of the working fluid will drop. The pressure is reduced below the level of the start of the cycle at the compressor inlet 412 and needs to be returned back up to the starting pressure. After work has been extracted by the turbine 404, the working fluid is provided to the recuperating heat exchanger 418 and a portion of the excess heat is transferred from the expanded working fluid to the working fluid between the compressor outlet 414 and the turbine inlet 420.

The generator 406 is operably coupled to the turbine 404 and the drive shaft 410 of the generator 406 may be driven by rotation of the turbine 404. The drive shaft 410 of the generator 406 may be arranged with bearings 424 and seals 426. The generator 406 may be arranged to generate power, such as through the rotation of a rotor relative to a stator, as will be appreciated by those of skill in the art.

As described above, efficiency of the closed loop supercritical system 400 may be impacted by windage and heat generation of the rotor of the generator 406 which may be driven on the drive shaft 410. Windage is managed by pumping out a generator cavity of the generator 406 well below the lowest cycle pressure. The pumping power itself is a parasitic loss to the system, and pumping and windage need to be balanced as efficiency loss mechanisms. The seals 426 are used to help reduce the pumping requirements. However, as noted, perfect seals are not be desirable due to consideration related to heat removal. Heat generated within the rotor of the generator 406 needs to be removed for the efficiency of the generator 406 to remain high. Leakage past seals into a generator cavity is typically used to cool the generator 406 before being pumped back to the $sCO_2$ cycle pressures. That is, leakage of the $sCO_2$ from the primary working fluid flow path 408 may be used to provide cooling to the generator 406 and then be reintroduced into the primary working fluid flow path 408.

It is desirable to have a method for windage and pumping power reduction, while maintaining a generator rotor temperature sufficiently low for efficient power conversion.

In view of this, a secondary working fluid is employed which may flow along a secondary working fluid flow path 428. The secondary working fluid may be, for example, hydrogen or helium. The secondary working fluid is used to cool and buffer a generator cavity of the generator 406, along with the bearings 424 and the seals 426. The secondary working fluid may be supplied to the generator cavity at sufficiently high pressure to prevent entry of $sCO_2$ into the generator cavity. That is, the secondary working fluid is maintained at a sufficiently high pressure to prevent the entrainment of $sCO_2$ into the generator 406 and thus the secondary working fluid provides the cooling, heat extraction, and buffering in place of the $sCO_2$ in typical configurations without such secondary working fluid.

The secondary working fluid flows from a cavity of the generator 406, through the bearings 424 and the seals 426 to the compressor 402 and turbine 404, along the secondary working fluid flow path 428. The secondary working fluid may be directed to rotor back-faces of the rotors of the compressor 402 and the turbine 404. After flowing past the rotor back-faces of the compressor 402 and the turbine 404, the secondary working fluid becomes entrained in the core flow paths of the compressor 402 and the turbine 404, along the primary flow path 408. As such, the secondary working fluid will mix with the primary working fluid within the compressor 402 and the turbine 404.

Because of this mixing, the separator 416 is arranged downstream of the compressor 402 along the primary flow path 408. It is noted that the compressor 402 is part of both the primary working fluid flow path 408 and the secondary working fluid flow path 428 and the compressor 402 operates to compress both working fluids to a uniform pressure and the mixing will achieve a uniform temperature. The mixed working fluids will then enter the separator 416 that is configured to remove the secondary working fluid (e.g., hydrogen or helium) from the primary working fluid (e.g., $sCO_2$) for subsequent cooling and reentry into the generator cavity. Accordingly, a secondary cooling heat exchanger 430 may be arranged along the secondary working fluid flow path 428 downstream of the separator 416.

Given the large difference in density between the secondary working fluid (e.g., hydrogen or helium) and the primary working fluid (e.g., $sCO_2$) at equivalent pressures, the separator 416 may be arranged as a cyclone or gravity separator. Alternatively, because the primary working fluid and the secondary working fluid may have large differences in molecular size, the separator 416 may be arranged as a membrane separator.

Figure 5:
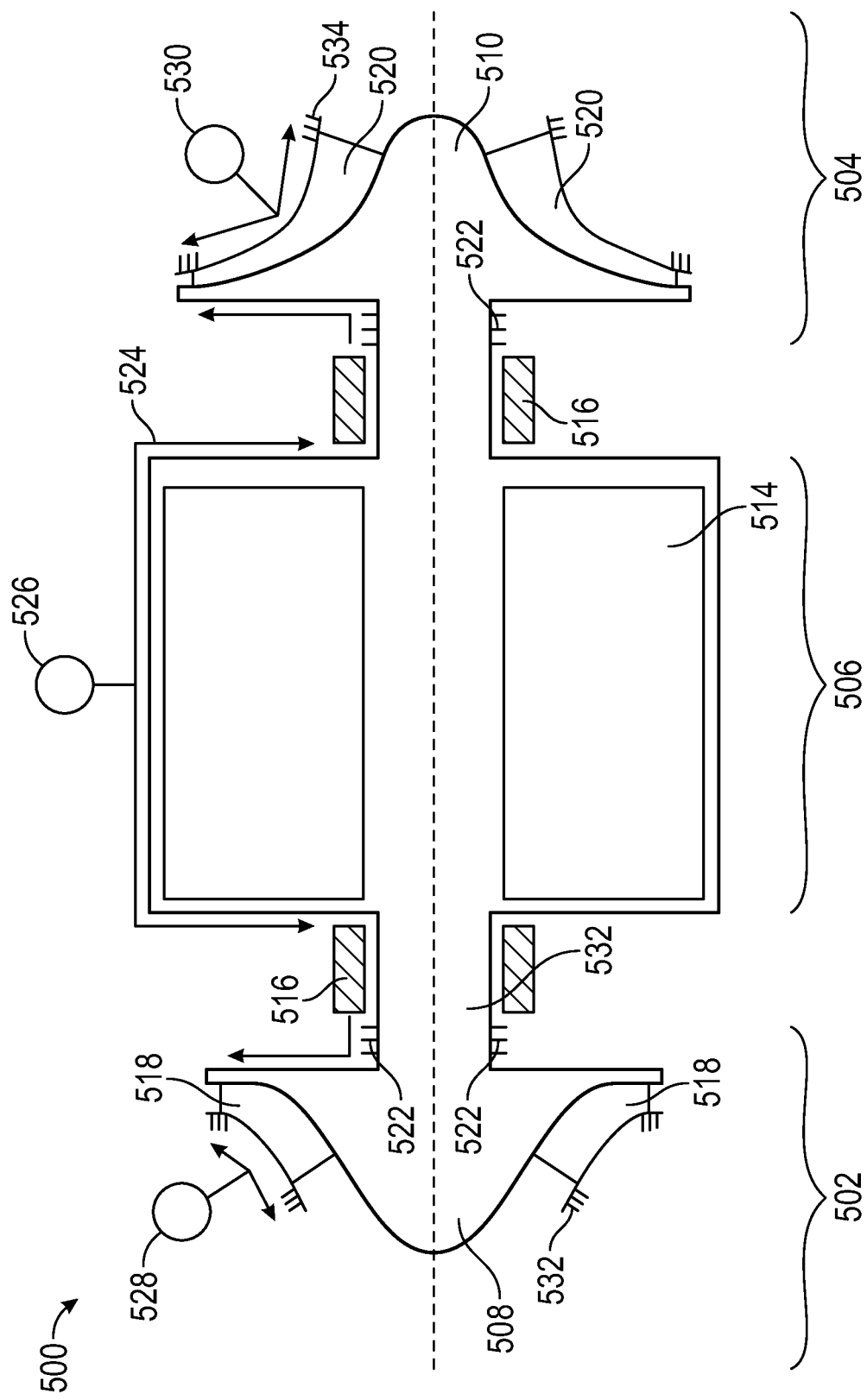
FIG. 5 is a schematic of a portion of a supercritical fluid system in accordance with an embodiment of the present disclosure.

Turning now to FIG. 5, a schematic illustration of a portion of a supercritical fluid system 500 in accordance with an embodiment of the present disclosure is shown. The supercritical fluid system 500 may be part of a larger system, for example as shown in FIG. 4, and may be a power generation system and/or a heat waste system. The supercritical fluid system 500 includes a compressor 502, a turbine 504, and a generator 506 arranged therebetween and operably coupled to the turbine 504. The compressor 502 and the turbine 504 may be arranged along and part of a primary working fluid flow path, such as $sCO_2$.

In the embodiment shown in FIG. 5, the compressor 502 includes a compressor hub 508 and the turbine 504 includes a turbine hub 510. A drive shaft 512 operably connects the compressor hub 508 and the turbine hub 510 and passes through the generator 506. The drive shaft 512 may be operably coupled to a generator rotor 514 that may be rotated by the drive shaft 512 to generate electricity when rotated relative to a generator stator, as will be appreciated by those of skill in the art. The drive shaft 512 may be supported and rotatable about bearings 516.

In this illustrative embodiment, each of the compressor 502 and the turbine 504 are arranged as shrouded configurations. That is, the compressor 502 includes shrouded compressor blades 518. Similarly, in this embodiment, the turbine 504 includes shrouded turbine blades 520.

To provide cooling and lubrication to the rotor 514, the bearings 516, and seals 522, a secondary working fluid flow path 524 is provided. The secondary working fluid flow path 524 may be configured to convey a secondary working fluid, such as hydrogen or helium, to provide cooling and lubrication. The secondary working fluid may be molecularly small compared to a primary working fluid that is used to drive rotation of the turbine 504, such as $sCO_2$. In addition, or alternatively, the secondary working fluid may be less dense compared to the primary working fluid. The secondary working fluid may be selected for the ability to be separated from the primary working fluid while also providing cooling and lubrication functionality. That is, the secondary working fluid may be selected based on viscous and heat transfer properties as compared to the primary working fluid.

The secondary working fluid will flow over the generator 506 and provide cooling and windage reduction thereto. Further, the secondary working fluid may provide lubrication to the bearings 516 and operate to ensure the seals 522 prevent entrainment of a primary working fluid into the generator 506. After passing along the rotor 514, the bearings 516, and the seals 522, the secondary working fluid may be used to cool a backside of the compressor hub 508 and the turbine hub 510. At this point, the secondary working fluid may enter into and mix with a primary working fluid along a primary working fluid flow path, such as shown and described above. The secondary working fluid may be injected into the system at one or more secondary fluid injection points 526, 528, 530. A first secondary fluid injection point 526 may be arranged to direct a portion of the secondary working fluid at the generator 506. A second secondary fluid injection point 528 may be provided to direct a portion of the secondary working fluid around the shrouded compressor blades 518 and associated seals 532, such as labyrinth seals. A third secondary fluid injection point 530 may be provided to direct a portion of the secondary working fluid around the shrouded turbine blades 520 and associated seals 534, such as labyrinth seals. The secondary working fluid supplies through the second and third secondary fluid injection points 528, 530 may provide cooling to front faces of the shrouded compressor blades 518 and the shrouded turbine blades 520.

Advantageously, embodiments of the present disclosure provide for improved efficiency supercritical $CO_2$ systems. Embodiments described herein can improve efficiency through the reduction of operating temperatures while reducing parasitic losses associated with pumping in such systems. In some embodiments, the viscous and heat transfer properties of a secondary working fluid as compared to a primary working fluid can reduce windage and provide cooling to a generator rotor. Such secondary working fluids can be hydrogen or helium, for example. Further, through the incorporation of a secondary working fluid flow path, the secondary working fluid may reduce windage associated to bearings, seals, and turbomachinery back-faces. Additionally, in some embodiments, additional cooling and buffering may be provided through application of the secondary working fluid to front-faces of the turbomachinery.

Furthermore, in some embodiments that employ hydrogen as the secondary working fluid, additional benefits may be realized in a $sCO_2$ cycle with direct fuel injection. The consumption of the hydrogen and separation and removal of combustion products is a requirement for a direct fuel injection $sCO_2$ cycle. The hydrogen also provides a chemically reducing environment to help manage corrosion that would otherwise take place in a $sCO_2$ environment.

Moreover, embodiments of the present disclosure may reduce compression processes in supercritical systems. In a typical $sCO_2$ cycle, for example, the working fluid may leak past seals and provide cooling for bearings and the generator. This leakage needs to be pumped from the low pressure of the generator cavity pressure back to the relatively high cycle pressure. The pump, in such configurations, represents a separate compression process from the one or more compression processes in the power generating cycle. Advantageously, embodiments of the present disclosure this re-pressurizing of the working fluid is combined with the compression processes in the power generating cycle (e.g., the combination of comprising the mixture of both first and second working fluids). As compressor efficiency typically increases with increasing flow, the combined compression process is anticipated to be more efficient.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed:

1. A supercritical fluid system comprising:
a compressor;
a turbine operably coupled to the compressor;
a generator operably coupled to the turbine and configured to generate power;
a primary working fluid flow path having a primary working fluid configured to pass through the compressor, a separator, the turbine, and back to the compressor; and
a secondary working fluid flow path having a secondary working fluid configured to pass through the generator, the compressor, the separator, and back to the generator,
wherein the primary working fluid and the secondary working fluid are compressed and mixed within the compressor to form a mixture of the two fluids, and
wherein the separator is configured to separate the primary working fluid from the secondary working fluid from the mixture of the two fluids and direct the primary working fluid back to the turbine along the primary working fluid flow path and the secondary working fluid along the secondary working fluid flow path to the generator.

2. The supercritical fluid system of claim 1, wherein the secondary working fluid is hydrogen.

3. The supercritical fluid system of claim 1, wherein the secondary working fluid is helium.

4. The supercritical fluid system of claim 1, wherein the compressor and the turbine are part of a waste heat recovery system of a gas turbine engine.

5. The supercritical fluid system of claim 1, wherein the mixture of the two fluids within the compressor has a uniform pressure and a uniform temperature at an outlet of the compressor.

6. The supercritical fluid system of claim 1, wherein the mixture is generated within the compressor.

7. The supercritical fluid system of claim 1, wherein the separator is a cyclone separator or a gravity separator.

8. The supercritical fluid system of claim 1, wherein the separator is a membrane separator.

9. The supercritical fluid system of claim 1, further comprising a recuperating heat exchanger arranged along the primary working fluid flow path.

10. The supercritical fluid system of claim 1, wherein the generator includes a rotor, wherein the secondary working fluid flow path passes along the rotor to provide cooling thereto.

11. The supercritical fluid system of claim 10, wherein the secondary working fluid is configured to prevent entrainment of the primary working fluid around the rotor.

12. The supercritical fluid system of claim 1, wherein the compressor is a shrouded blade compressor and the secondary working fluid is directed to provide cooling to shrouded blades of the shrouded blade compressor.

13. The supercritical fluid system of claim 1, wherein the turbine is a shrouded blade turbine and the secondary working fluid is directed to provide cooling to shrouded blades of the shrouded blade turbine.

14. The supercritical fluid system of claim 1, further comprising a cooling heat exchanger arranged along the secondary working fluid flow path between the separator and the generator.

15. The supercritical fluid system of claim 1, wherein the compressor, the generator, and the turbine are part of an industrial generator.

16. An aircraft power system comprising:
at least one engine; and
a supercritical fluid system comprising:
a compressor;
a turbine operably coupled to the compressor;
a generator operably coupled to the turbine and configured to generate power;
a primary working fluid flow path having a primary working fluid configured to pass through the compressor, a separator, the turbine, and back to the compressor; and
a secondary working fluid flow path having a secondary working fluid configured to pass through the generator, the compressor, the separator, and back to the generator,
wherein the primary working fluid and the secondary working fluid are compressed and mixed within the compressor to form a mixture of the two fluids, and
wherein the separator is configured to separate the primary working fluid from the secondary working fluid from the mixture of the two fluids and direct the primary working fluid back to the turbine along the primary working fluid flow path and the secondary working fluid along the secondary working fluid flow path to the generator.

17. The aircraft power system of claim 16, wherein the supercritical fluid system is configured as a waste heat recovery system for the at least one engine.

18. The aircraft power system of claim 16, wherein the secondary working fluid is hydrogen.

19. The aircraft power system of claim 16, wherein the secondary working fluid is helium.

20. The aircraft power system of claim 16, wherein the supercritical fluid system is configured to generate power for the aircraft.

* * * * *